US012223265B2

(12) United States Patent
Nakov et al.

(10) Patent No.: US 12,223,265 B2
(45) Date of Patent: Feb. 11, 2025

(54) EXPLAINABLE PROPAGANDA DETECTION

(71) Applicants: Qatar Foundation for Education, Science and Community Development, Doha (QA); Massachusetts Institute of Technology, Cambridge, MA (US)

(72) Inventors: Preslav I. Nakov, Doha (QA); Giovanni Da San Martino, Doha (QA); Seunghak Yu, Doha (QA)

(73) Assignees: QATAR FOUNDATION FOR EDUCATION, SCIENCE AND COMMUNITY DEVELOPMENT, Doha (QA); MASSACHUSETTS INSTITUTE OF TECHNOLOGY, Cambridge, MA (US)

( * ) Notice: Subject to any disclaimer, the term of this patent is extended or adjusted under 35 U.S.C. 154(b) by 337 days.

(21) Appl. No.: 17/855,248

(22) Filed: Jun. 30, 2022

(65) Prior Publication Data
US 2023/0004712 A1    Jan. 5, 2023

Related U.S. Application Data

(60) Provisional application No. 63/216,945, filed on Jun. 30, 2021.

(51) Int. Cl.
*G06F 40/205* (2020.01)
*G06F 3/04842* (2022.01)
*G06F 40/289* (2020.01)

(52) U.S. Cl.
CPC ........ *G06F 40/205* (2020.01); *G06F 3/04842* (2013.01); *G06F 40/289* (2020.01)

(58) Field of Classification Search
None
See application file for complete search history.

(56) References Cited

U.S. PATENT DOCUMENTS

| 8,296,168 | B2 | 10/2012 | Subrahmanian et al. |
| 9,189,540 | B2 | 11/2015 | Hailpern et al. |
| 9,727,925 | B2 | 8/2017 | Subramanian et al. |
| 2017/0116204 | A1* | 4/2017 | Davulcu .............. G06F 16/355 |
| 2018/0225275 | A1* | 8/2018 | Oleynikov .......... G06V 30/413 |

(Continued)

OTHER PUBLICATIONS

Devlin, Jacob, et al. "Bert: Pre-training of deep bidirectional transformers for language understanding." arXiv preprint arXiv:1810.04805 (2018). (Year: 2018).*

(Continued)

*Primary Examiner* — Douglas Godbold
(74) *Attorney, Agent, or Firm* — K&L Gates LLP (57) ABSTRACT

Explainable propaganda detection is provided by parsing each sentence of a plurality of sentences in an article for structural details; identifying, via a machine learning model, dimensional features across the plurality of sentences based on the structural details; identifying, via the machine learning model, a propagandizing tactic demonstrated in each sentence of the plurality of sentences based a covariance score to the propagandizing tactic and the plurality of dimensional features identified for a given sentence; and displaying, in a user interface that includes the article, propaganda labels corresponding to the propagandizing tactic identified for each sentence of the plurality of sentences.

19 Claims, 4 Drawing Sheets

(56) References Cited

U.S. PATENT DOCUMENTS

| | | | | |
|---|---|---|---|---|
| 2018/0285342 | A1* | 10/2018 | Chew | G06F 16/93 |
| 2018/0365562 | A1* | 12/2018 | Volkova | G06N 7/01 |
| 2019/0034823 | A1* | 1/2019 | Thapliyal | G06F 16/35 |
| 2019/0179956 | A1* | 6/2019 | Krasadakis | G06F 40/35 |
| 2020/0202071 | A1* | 6/2020 | Ghulati | G06Q 50/01 |
| 2022/0164643 | A1* | 5/2022 | Charnock | G06N 3/04 |
| 2022/0199070 | A1* | 6/2022 | Hsu | G10L 15/18 |
| 2024/0185062 | A1* | 6/2024 | Charnock | G06N 3/08 |

OTHER PUBLICATIONS

Yu, Seunghak, et al. "Interpretable propaganda detection in news articles." arXiv preprint arXiv:2108.12802 (2021). (Year: 2021).*

Da San Martino, Giovanni, et al. "Fine-grained analysis of propaganda in news article." Proceedings of the 2019 conference on empirical methods in natural language processing and the 9th international joint conference on natural language processing (Year: 2019).*

Nanavati et al., "Identifying Propaganda in Online News Articles Using a Cross-Disciplinary Approach", Workshop on Bias, Disinformation, Misinformation, and Propaganda in Online New and Social Media at Socinfo (2019), Hamad Bin Khalifa University, pp. 1-5.

Rashkin et al., "Truth of Varying Shades: Analyzing Language in Fake News and Political Fact-Checking", Proceedings of the 2017 Conference on Empirical Methods in Natural Language Processing (2017), Copenhagen, Denmark, Association for Computational Linguistics, pp. 2931-2937.

Recasens et al., "Linguistic Models for Analyzing and Detecting Biased Language", Proceedings of the 51st Annual Meeting of the Association for Computational Linguistics (2013), Sofia, Bulgaria, Association for Computational Linguistics, pp. 1650-1659.

* cited by examiner

EXPLAINABLE PROPAGANDA DETECTION

CROSS-REFERENCES TO RELATED APPLICATIONS

The present disclosure claims priority to U.S. Provisional Patent Application No. 63/216,945 filed on Jun. 30, 2021 and having the title "EXPLAINABLE PROPAGANDA DETECTION," which is incorporated herein by reference in its entirety.

TECHNICAL FIELD

The present disclosure relates to computer systems and more specifically to classifying documents using machine learning.

SUMMARY

The present disclosure provides new and innovative systems and methods for identifying propaganda in news articles.

According to a non-limiting aspect of the present disclosure, a method includes analyzing text data, identifying propaganda in the text data, and categorizing the identified propaganda.

In another non-limiting aspect of the present disclosure, the method includes displaying labels corresponding to the categorized identified propaganda.

In another non-limiting aspect of the present disclosure, the text data includes a news article.

In another non-limiting aspect of the present disclosure, a method includes parsing each sentence of a plurality of sentences in an article for structural details; identifying, via a machine learning model, dimensional features across the plurality of sentences based on the structural details; identifying, via the machine learning model, a propagandizing tactic demonstrated in each sentence of the plurality of sentences based a covariance score to the propagandizing tactic and the plurality of dimensional features identified for a given sentence; and displaying, in a user interface that includes the article, propaganda labels corresponding to the propagandizing tactic identified for each sentence of the plurality of sentences.

In another non-limiting aspect of the present disclosure, a system includes a processor; and a memory, that includes instructions that when executed by the processor perform operations, including: parsing each sentence of a plurality of sentences in an article for structural details; identifying, via a machine learning model, dimensional features across the plurality of sentences based on the structural details; identifying, via the machine learning model, a propagandizing tactic demonstrated in each sentence of the plurality of sentences based a covariance score to the propagandizing tactic and the plurality of dimensional features identified for a given sentence; and displaying, in a user interface that includes the article, propaganda labels corresponding to the propagandizing tactic identified for each sentence of the plurality of sentences In another non-limiting aspect of the present disclosure, memory apparatus that includes instructions that when executed by a processor perform various operations, comprising: parsing each sentence of a plurality of sentences in an article for structural details; identifying, via a machine learning model, dimensional features across the plurality of sentences based on the structural details; identifying, via the machine learning model, a propagandizing tactic demonstrated in each sentence of the plurality of sentences based a covariance score to the propagandizing tactic and the plurality of dimensional features identified for a given sentence; and displaying, in a user interface that includes the article, propaganda labels corresponding to the propagandizing tactic identified for each sentence of the plurality of sentences.

Additional features and advantages of the disclosed method and apparatus are described in, and will be apparent from, the following Detailed Description and the Figures. The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION

The present disclosure provides systems and methods for identifying propaganda in text data, such as news articles. Nowadays, online users are exposed to misleading and propagandist news articles and media posts on a daily basis. To counter this, a number of approaches have been designed aiming to achieve a healthier and safer online news and media consumption. Automatic systems are able to support humans in detecting such content; yet, a major impediment to their broad adoption is that, besides being inaccurate, such systems need to provide explanations for their decisions in order to be trusted and widely adopted by users. Since misleading and propagandist content influences the readers through the use of a number of deception techniques, the present disclosure provides for the detection and illustration of the use of such techniques as a way to ultimately provide explainability for downstream tasks. In particular, the present disclosure defines qualitatively descriptive features and that are analyzed for suitability for detecting deception techniques. The present disclosure further demonstrates that the described methods can be readily combined with pre-trained language models, yielding state-of-the-art results.

Explainability is indispensable if propaganda detection systems are to be trusted and accepted by the users. According to the confirmation bias theory, persons generally easily accept new information that is consistent with existing beliefs, but are less likely to do so when that information contradicts what those persons already know. Thus, even if a model can correctly predict which news is propaganda, if the model fails to explain why this is the case, persons are more likely to reject the results and to stick to what they want to believe. In order to address this issue, the present disclosure reformulates the propaganda detection task via a model that can explain the prediction results. The described method can detect propaganda for each sentence in a given article and can explain what propaganda technique is used with the human-understandable semantic and syntactic features.

Additionally, the described model selectively operates with using veracity as a propagandizing tactic. As many pieces of propaganda include outright falsehoods (e.g., "fake news", "the big lie", conspiracy theories, etc.), veracity may be a useful feature in detecting propaganda. However, as factual errors can also be accidental or the result of facts changing over time, veracity may only be useful to help detect propaganda in a subset of cases. Additionally, fact checking is a laborious and computationally difficult task. Accordingly, the described model may selectively operate with checking the veracity of statements included in certain articles, thereby allowing the model to conserve computing resources when veracity is an unreliable indicator of propaganda and improving the end result for a reader. Additionally, the described model may selectively operate without checking the veracity of statements included in certain articles, thereby allowing the model to identify falsehoods as the propaganda type and avoid reanalyzing those sentences according to other propagandizing tactics when veracity is a reliable indicator of propaganda, thereby also conserving computing resources and improving the end result for a reader.

Figure 1:
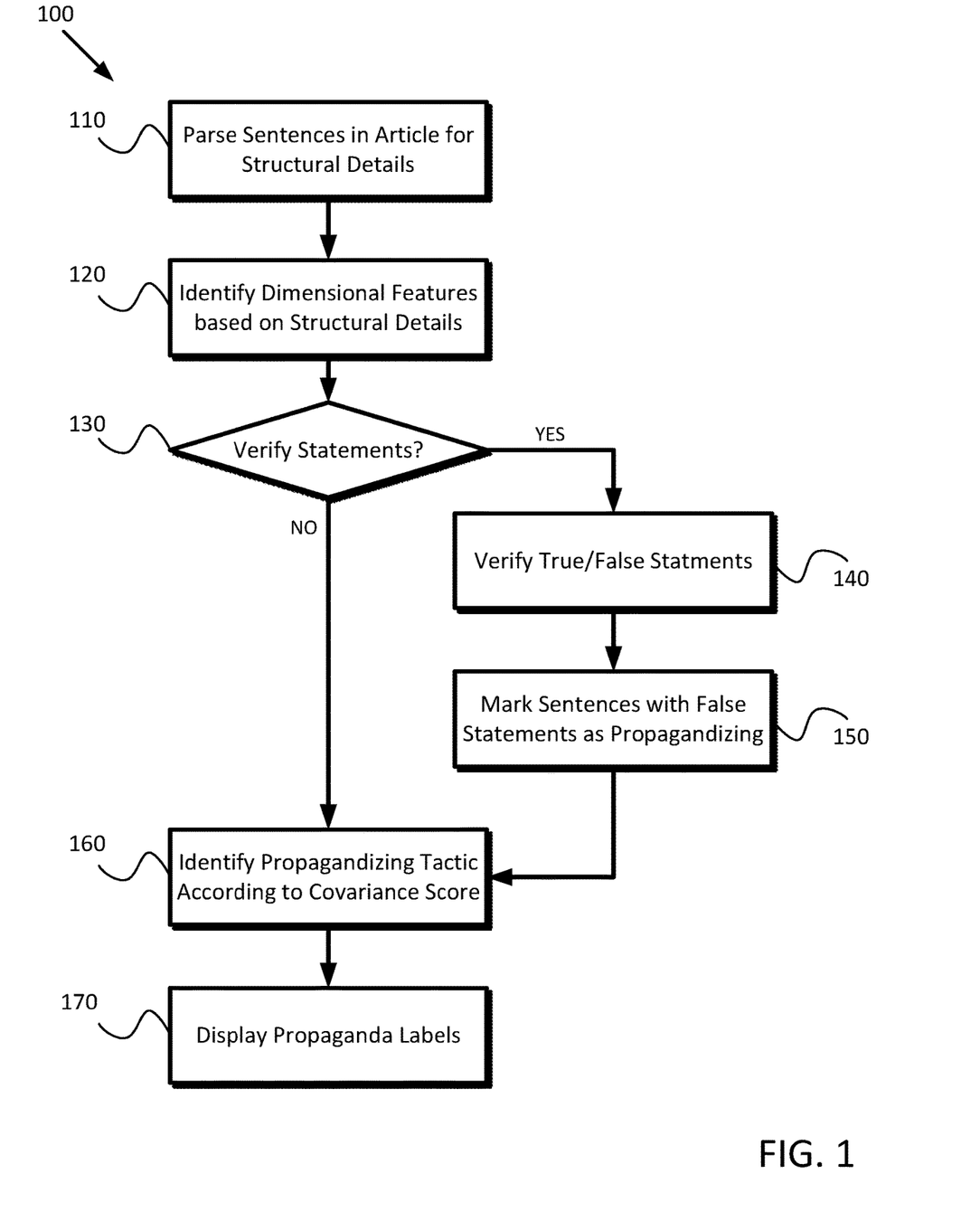
FIG. 1 is a flowchart of a method for providing explainable propaganda detection, according to aspects of the present disclosure.

FIG. 1 is a flowchart of a method 100 for providing explainable propaganda detection, according to aspects of the present disclosure. Method 100 begins with operation 110, where the model parses each sentence of a plurality of sentences in an article for structural details. In various aspects, the article may be an electronic document, a website, a transcript of a spoken conversation, a printed work (e.g., a book, magazine, newspaper), an excerpt therefrom, or an amalgamation of two or more articles. The structural details of the sentences include various features and arrangements of the words such as whether the sentence is or contains: a simple declarative, an introductory subordinating conjunction, a direct question, an inverted declarative, an inverted yes/no question, an adjective phrase, an adverb phrase, a conjunction phrase, a fragment, an interjection, a list marker, a no constituent, a noun phase, a head complex noun phrase, a prepositional noun phrase, a parenthetical, a particle, a quantifier phrase, a reduced relative clause, an unlike coordinated phrase, a verb phrase, a wh-adjective phase (e.g., the "wh" referring to the inclusion of who/what/where/when/why/how in the phrase), a wh-verb phrase, a wh-adverb phrase, an wh-noun phrase, a wh-prepositional phrase, or an unknown/unclassifiable phrase. Although these examples are given in relation to the English language, the present disclosure contemplates that similar structural details of sentences constructed in other languages can be parsed, which may include more or fewer structures according to the grammatical rules of that language.

In various aspects, the model identifies a title of the article, which is treated as a sentence, but may be referenced by the model in comparison to other sentences. In some aspects, the model, to conserve computing resources, may limit the number of sentences analyzed to a threshold number. Because human readers often do not finish reading articles, and many writing styles emphasize stating important points earlier in an article, the model may restrict analysis to the first N sentences (including the title) of the article, thereby creating an except for analysis in place of the entire article. Additionally or alternatively, the model (or a reader application in communication with the model) can indicate that a human reader has progressed through an initial section of the article (e.g., the first N sentences or the first N-M sentences, where M is a padding threshold selected by the model or human reader to allow the model time for processing before the human reader reaches the end of the Nth sentence), and the model may select a subsequent excerpt (including the title and, for example, sentences N+1 through 2 N) or a remainder of the article to provide analysis to the human reader according to method 100.

At operation 120, the model identifies, dimensional features across the plurality of sentences based on the structural details. In various aspects, the dimensional features include: a relative position of a given sentence in the article relative to other sentences; a semantic stance of the given sentence relative to a title of the article; a sentiment of the given sentence; and an article-level prediction of the article as a whole being propaganda. In some aspects, the semantic stance is selected from available categories of: related agreeing; related disagreeing; related discussing; and unrelated in relation to the topic or theme of the sentence and the topic or theme of the title. In some aspects, the sentiment is selected from available categories of: positive; negative; neutral; and compound.

At operation 130, the model determines whether to verify the truthfulness of the statements as part of identifying propagandizing tactics. The model does not need to identify the truthfulness of the sentences when analyzing for propagandizing tactics, and the use of such analysis may have inconsistent results. For example, an older article may include out-of-date facts that, while true at the time the article was first created, as false now, and may result in false positives for the inclusion of "lying" as a propagandizing tactic. In a contrasting example, an article may be facially neutral in many of its sentences but include "the big lie" as a propagandizing tactic. Additionally, fact-checking is a computationally difficult task that may include the use of human fact checkers in the loop where a machine learning model has difficulty in differentiating true or false statements. Accordingly, the presently described model may selectively use fact-checking when identifying propagandizing tactics in an article.

In various aspects, the model may receive a veracity selection from a human user for whether the model is to include the veracity of information included in the sentence when identifying the propagandizing tactic demonstrated in each sentence of the plurality of sentences. When the model is to verify the statements included in the sentences, method 100 proceeds to operation 140. Otherwise, when the model is not to verify the statements included in the sentences, method 100 proceeds to operation 160.

At operation 140, the model verifies the true/false statements included in the sentences. In various aspects, the model may identify the sentences that include verifiable facts and compare those facts against a database of known values corresponding to those facts, pass the sentences to human reviewers, or perform a combination of machine and human review.

At operation 150, the model marks sentences that include false statements as propagandizing by lying (e.g., the propagandizing tactic is lying). Because these sentences have been identified as propagandizing, the model may remove these sentences from further analysis according to other propagandizing tactics, thereby conserving computing resources when analyzing the article. However, any sentence that does not include a false statement, may include other propagandizing tactics and is analyzed for such by the model (e.g., by selecting the propagandizing tactics for any sentences that exclude false statements according to operation 160).

At operation 160, the model identifies the propagandizing tactic demonstrated in each sentence according to a covariance score between the propagandizing tactic and the plurality of dimensional features identified for a given sentence. When the model is instructed to use the veracity of the statements in the sentences (e.g., yes, at operation 130) any sentences that include falsehoods may be excluded from analysis as already being categorized for exhibiting the propagandizing tactic of lying, while the sentences that were not found to include falsehoods are analyzed according to the covariance score. When the model is instructed to not use the veracity of the statements in the sentences (e.g., no, at operation 130), the model categories all of the statements according to the covariance score (e.g., false statements are categorized identically to true statements, as the model does not know and does not use as an input the veracity of the statements).

Figure 2:
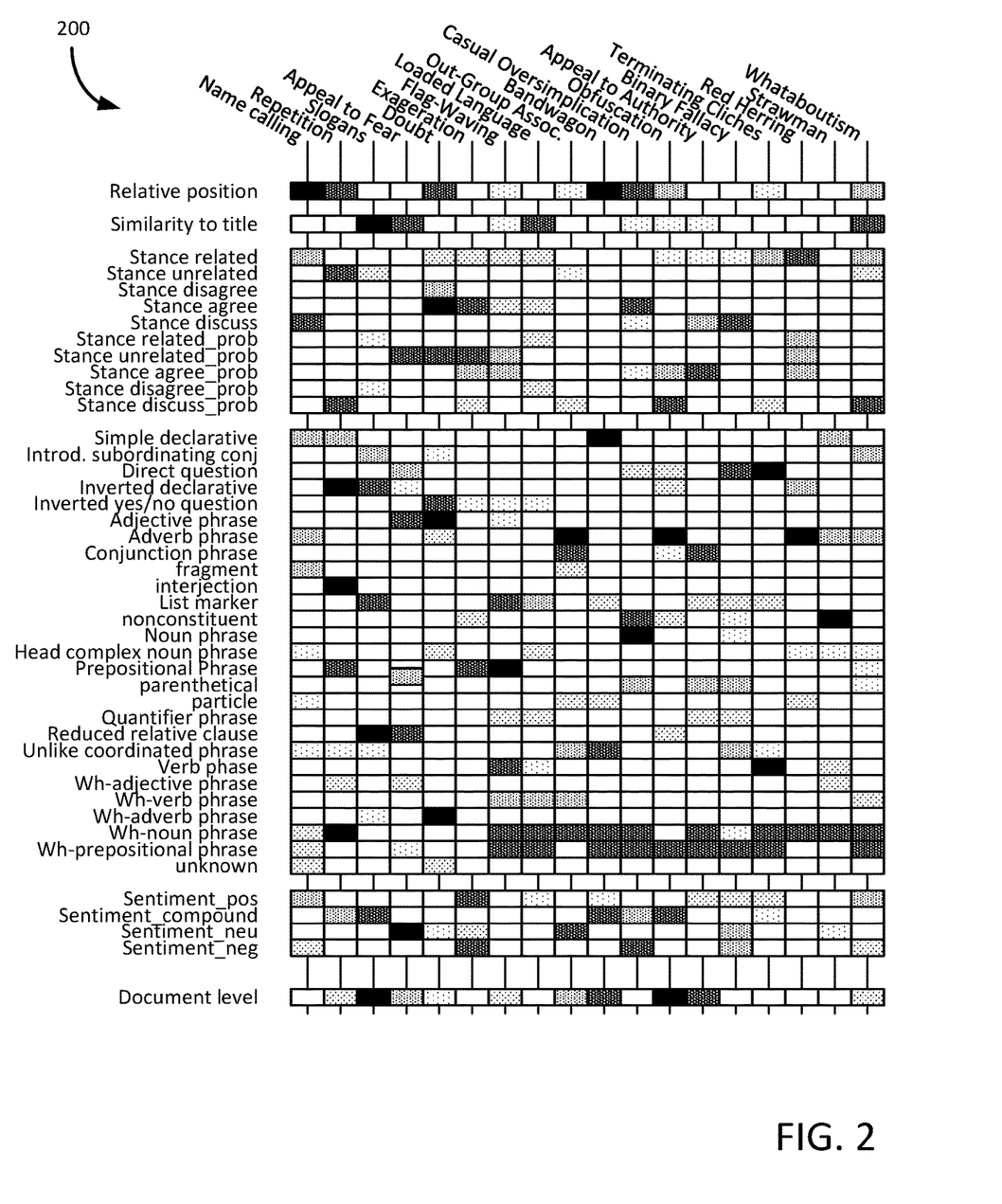
FIG. 2 is a classification chart, according to aspects of the present disclosure.

The model is trained to develop covariance scores between various propagandizing tactics and the dimensional features parsed from the sentences, as many of these techniques (regardless of content) display similar grammatical and structural elements across different articles. For example, FIG. 2 is a classification chart 200 for providing explainable propaganda detection, according to aspects of the present disclosure, where each propagandizing tactic is correlated to various dimensional features, where darker entries in the matrix indicate a stronger correlation than lighter entries in the matrix. The example classification chart 200 in FIG. 2 is populated based on how the model is trained, and the present disclosure contemplates that different training datasets and different model types may result in different covariance scoring results in other classification charts 200. Accordingly, the distribution of scores illustrated in FIG. 2 is presented as a non-limiting example.

In various aspects, the propagandizing tactics are selected from a list of available techniques that includes: name calling; repetition; the use of slogans; making appeals to fear; raising doubt; making or using exaggerations; flag-waving (e.g., appealing to patriotism or in-group status); using loaded or intentionally provocative language; associating a behavior with an out-group or despised person; appeals to bandwagon (e.g., "everyone else is doing/believing/saying this"; casual oversimplification (e.g., minimizing complicated details or nuance); use obfuscation or confusing language; making an appeal to authority; presenting a binary fallacy ("either option A or option B," with no alternatives or middle positions presented as possible); the use of thought-terminating clichés to prematurely end contemplation of a topic; the use of red herrings to draw away from a topic; the use of strawman arguments to "win" a position against a simple-to-defeat counter position; the use of whataboutisms to deflect criticism back to the failings or shortcomings of another party (e.g., "what about the time when my opponent did X?") and none (e.g., when no propagandizing tactic is identified for the sentence).

In various aspects, the model ranks the covariance scores assigned to the sentence based on all of the dimensional features and combines (e.g., via addition, multiplication, weighted addition, etc.) the scores for all of the dimensional features in each category of propagandizing tactic. The model then selects one propagandizing tactic from among the available propagandizing tactics to output to the human reader. In various aspects, when the highest covariance score for any of the other propagandizing tactics is below a propaganda threshold value, the model selects "none" as the propagandizing tactic for the sentence. In various aspects, when two or more propagandizing tactics satisfy the propaganda threshold value, the model may select the technique with the higher score, the technique identified first in the sentence (e.g., according to reading order), or based on a priority of techniques seen in the article. For example, a sentence demonstrating "exaggeration" may also represent "repetition" if following another sentence demonstrating "exaggeration", and the model may select "repetition" as the demonstrated propaganda technique even when "exaggeration" has a higher covariance score for that sentence. In another example, when a sentence is identified as including "exaggeration" and "name calling," the model may select "name calling" as the demonstrated propaganda technique even when "exaggeration" has a higher covariance score for that sentence when name calling occurred earlier in the sentence.

Figure 3:
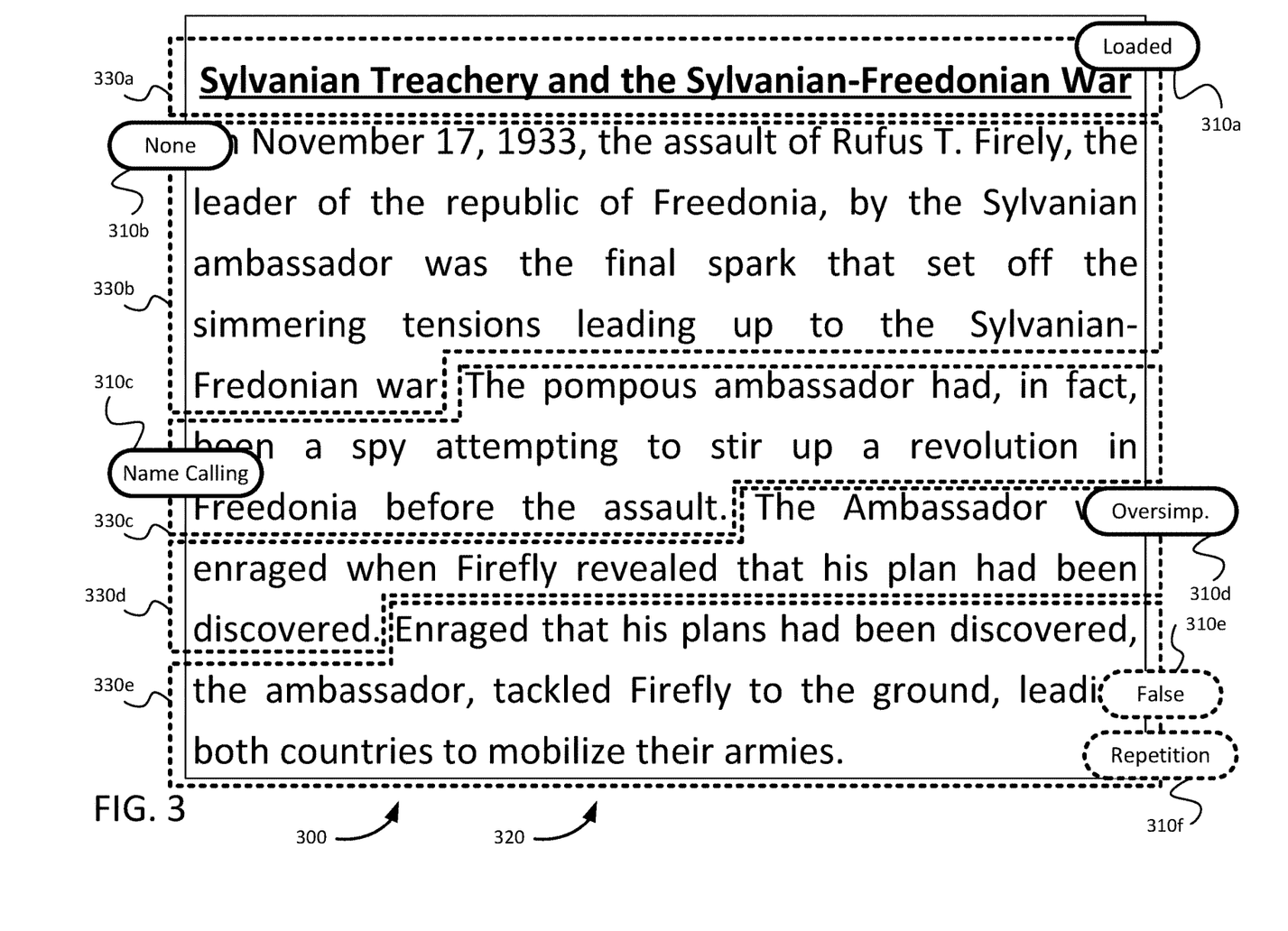
FIG. 3 illustrates a user interface, according to aspects of the present disclosure.

Returning to FIG. 1, at operation 170, the model displays, in a user interface that includes the article, propaganda labels corresponding to the propagandizing tactic identified for each sentence from the article. For example, FIG. 3 illustrates a user interface 300, such as may be used to display the results of method 100 described in relation to FIG. 1, according to aspects of the present disclosure.

In the fictional account presented in the article 320 shown in the user interface 300, each sentence 330*a*-*e* (generally or collectively, sentence 330) is highlighted as shown with a corresponding propaganda label 310*a*-*f* (generally or collectively, label 310) that shows the output of the model's analysis to the human reader in the user interface 300 for each sentence 330. The present disclosure contemplates other representations of the determined propagandizing tactics, which may include colors, shapes, words, and positions different than those illustrated in FIG. 3 based on the display device, user preferences, and design considerations that are considered within the ability of one of ordinary skill in the art to select without undue experimentation.

In the illustrated example, the first sentence 330*a* is identified as a title for the article 320 that includes the propagandizing tactic of using loading language (e.g., the use of the word "treachery"), which is demonstrated in the first label 310*a* as "loaded".

The second sentence 330*b* is identified as not including any propagandizing tactics, which is demonstrated in the second label 310*b* as "none", although in some aspects, when a sentence is identified as not demonstrating a propagandizing tactic, a label 310 may be omitted.

The third sentence 330*c* is identified as demonstrating the propagandizing tactic of using name calling (e.g., the use of the word "pompous" to describe the ambassador), which is demonstrated in the third label 310*c* as "name calling". However, the third sentence 330*c* may also demonstrate "flag-waving" by calling out that the ambassador was acting as a spy and attempting to cause a disturbance in the human reader's country, and the model may have selected "name calling" in favor of "flag waving" based on "name calling" having a higher covariance score, occurring earlier in the third sentence 330*c*, or having a higher priority for display than "flag-waving".

The fourth sentence 330*d* is identified as demonstrating the propagandizing tactic of using over simplification (e.g., the ambassador's emotional state may not be a direct or sole cause of his later action), which is demonstrated in the third label 310*c* as "oversimp." In various aspects, different abbreviations or codes may be used to represent the propagandizing tactics according to the space and readability restrictions of the user interface.

The fifth sentence 330*e* is presented with two labels 310; the fifth label 310*e* stating "false" and the sixth label 310*f* stating "repetition". When the model was instructed to verify the truthfulness of the sentences 330 (e.g., yes at operation 130 in method 100, discussed in relation to FIG. 1), the model may determine that the fifth sentence 330e includes a falsehood (e.g., the ambassador may have struck Firefly, not tackled Firefly) and is to be categorized as demonstrating the propagandizing tactic of lying, and is therefore displayed in the user interface 300 with the fifth label 310e (and not the sixth label 310f). When the model was instructed to not verify the truthfulness of the sentences 330 (e.g., no at operation 130 in method 100), the model may determine that the fifth sentence 330e includes a repetition of the claim that the ambassador was engaged (from the fourth sentence 330d) and is to be categorized as demonstrating the propagandizing tactic of repetition, and is therefore displayed in the user interface 300 with the sixth label 310f (and not the fifth label 310e).

Figure 4:
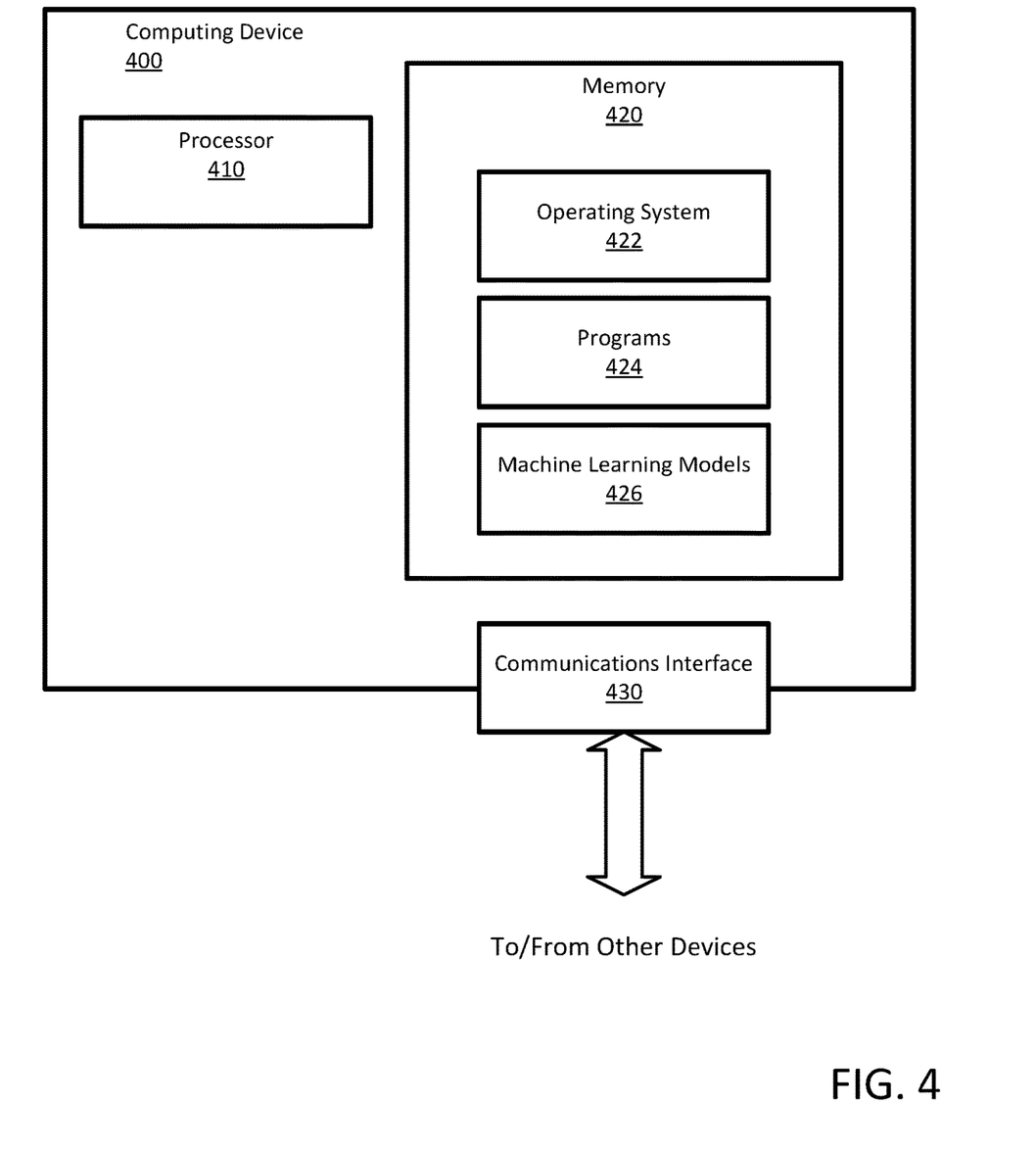
FIG. 4 illustrates a computer system, according to aspects of the present disclosure.

FIG. 4 illustrates a computer system 400, such as may be used to perform method 100 described in relation to FIG. 1, according to aspects of the present disclosure. The computer system 400 may include at least one processor 410, a memory 420, and a communication interface 430. In various embodiments, the physical components may offer virtualized versions thereof, such as when the computer system 400 is part of a cloud infrastructure providing virtual machines (VMs) to perform some or all of the tasks or operations described for the various devices in the present disclosure.

The processor 410 may be any processing unit capable of performing the operations and procedures described in the present disclosure. In various embodiments, the processor 410 can represent a single processor, multiple processors, a processor with multiple cores, and combinations thereof. Additionally, the processor 410 may include various virtual processors used in a virtualization or cloud environment to handle client tasks.

The memory 420 is an apparatus that may be either volatile or non-volatile memory and may include RAM, flash, cache, disk drives, and other computer readable memory storage devices. Although shown as a single entity, the memory 420 may be divided into different memory storage elements such as RAM and one or more hard disk drives. Additionally, the memory 420 may include various virtual memories used in a virtualization or cloud environment to handle client tasks. As used herein, the memory 420 is an example of a device that includes computer-readable storage media, and is not to be interpreted as transmission media or signals per se.

As shown, the memory 420 includes various instructions that are executable by the processor 410 to provide an operating system 422 to manage various operations of the computer system 400 and one or more programs 424 to provide various features to users of the computer system 400, which include one or more of the features and operations described in the present disclosure. One of ordinary skill in the relevant art will recognize that different approaches can be taken in selecting or designing a program 424 to perform the operations described herein, including choice of programming language, the operating system 422 used by the computer system 400, and the architecture of the processor 410 and memory 420. Accordingly, the person of ordinary skill in the relevant art will be able to select or design an appropriate program 424 based on the details provided in the present disclosure.

Additionally, the memory 420 can include one or more of machine learning models 426 for explainable propaganda detection, as described in the present disclosure. As used herein, the machine learning models 426 may include various algorithms used to provide "artificial intelligence" to the computer system 400, which may include Artificial Neural Networks, decision trees, support vector machines, genetic algorithms, Bayesian networks, or the like. The models may include publically available services (e.g., via an Application Program Interface with the provider) as well as purpose-trained or proprietary services. One of ordinary skill in the relevant art will recognize that different domains may benefit from the use of different machine learning models 426, which may be continuously or periodically trained based on received feedback. Accordingly, the person of ordinary skill in the relevant art will be able to select or design an appropriate machine learning model 426 based on the details provided in the present disclosure.

The communication interface 430 facilitates communications between the computer system 400 and other devices, which may also be computer system 400 as described in relation to FIG. 4. In various embodiments, the communication interface 430 includes antennas for wireless communications and various wired communication ports. The computer system 400 may also include or be in communication, via the communication interface 430, one or more input devices (e.g., a keyboard, mouse, pen, touch input device, etc.) and one or more output devices (e.g., a display, speakers, a printer, etc.).

Accordingly, the computer system 400 is an example of a system that includes a processor 410 and a memory 420 that includes instructions that (when executed by the processor 410) perform various embodiments of the present disclosure. Similarly, the memory 420 is an apparatus that includes instructions that when executed by a processor 410 perform various embodiments of the present disclosure.

Although the present invention has been described in certain specific aspects, many additional modifications and variations would be apparent to those skilled in the art. In particular, any of the various processes described above can be performed in alternative sequences and/or in parallel (on the same or on different computing devices) in order to achieve similar results in a manner that is more appropriate to the requirements of a specific application. It is therefore to be understood that the present invention can be practiced otherwise than specifically described without departing from the scope and spirit of the present invention. Thus, embodiments of the present invention should be considered in all respects as illustrative and not restrictive. It will be evident to the annotator skilled in the art to freely combine several or all of the embodiments discussed here as deemed suitable for a specific application of the invention. Throughout this disclosure, terms like "advantageous", "exemplary" or "preferred" indicate elements or dimensions which are particularly suitable (but not essential) to the invention or an embodiment thereof, and may be modified wherever deemed suitable by the skilled annotator, except where expressly required. Accordingly, the scope of the invention should be determined not by the embodiments illustrated, but by the appended claims and their equivalents.

What is claimed is:

1. A method, comprising:
   parsing each sentence of a plurality of sentences in an article for structural details, wherein the plurality of sentences represent a threshold number of sentences selected from a beginning of the article;
   identifying, via a machine learning model, dimensional features across the plurality of sentences based on the structural details;
   identifying, via the machine learning model, a propagandizing tactic demonstrated in each sentence of the plurality of sentences based on a covariance score to the propagandizing tactic and the dimensional features identified for a given sentence; and displaying, in a user interface that includes the article, propaganda labels corresponding to the propagandizing tactic identified for each sentence of the plurality of sentences.

2. The method of claim 1, wherein the propagandizing tactic is selected by the machine learning model from a list comprising:
name calling;
repetition;
slogans;
appeal to fear;
doubt;
exaggeration;
flag-waving;
loaded language;
association with an out-group;
bandwagon;
casual oversimplification;
obfuscation;
appeal to authority;
binary fallacy;
thought-terminating clichés;
red herrings;
strawman arguments;
whataboutisms; and
none.

3. The method of claim 2, further comprising, in response to receiving a veracity selection from a user to include the veracity of information included in the sentence when identifying the propagandizing tactic demonstrated in each sentence of the plurality of sentences:
identifying whether statements included in each of the sentences of the plurality of sentences are true or false;
categorizing any sentences of the plurality of sentences that includes a false statement demonstrating a lying propagandizing tactic; and
selecting the propagandizing tactic for any sentences of the plurality of sentences that exclude false statements from the list.

4. The method of claim 2, further comprising, in response to receiving a veracity selection from a user to ignore the veracity of information included in the sentence when identifying the propagandizing tactic demonstrated in each sentence of the plurality of sentences:
categorizing false statements identically to true statements when selecting the propagandizing tactic from the list.

5. The method of claim 1, wherein the dimensional features include:
a relative position of a given sentence in the article relative to other sentences;
a semantic stance of the given sentence relative to a title of the article;
a sentiment of the given sentence; and
an article-level prediction of the article as a whole being propaganda.

6. The method of claim 5, wherein the semantic stance is selected from a group including:
related agreeing;
related disagreeing;
related discussing; and
unrelated.

7. The method of claim 5, wherein the sentiment is selected from a group including:
positive;
negative;
neutral; and
compound.

8. A system, comprising:
a processor; and
a memory, that includes instructions that when executed by the processor perform operations, including:
parsing each sentence of a plurality of sentences in an article for structural details, wherein the plurality of sentences represent a threshold number of sentences selected from a beginning of the article;
identifying, via a machine learning model, dimensional features across the plurality of sentences based on the structural details;
identifying, via the machine learning model, a propagandizing tactic demonstrated in each sentence of the plurality of sentences based on a covariance score to the propagandizing tactic and the dimensional features identified for a given sentence; and
displaying, in a user interface that includes the article, propaganda labels corresponding to the propagandizing tactic identified for each sentence of the plurality of sentences.

9. The system of claim 8, wherein the propagandizing tactic is selected by the machine learning model from a list comprising:
name calling;
repetition;
slogans;
appeal to fear;
doubt;
exaggeration;
flag-waving;
loaded language;
association with an out-group;
bandwagon;
casual oversimplification;
obfuscation;
appeal to authority;
binary fallacy;
thought-terminating clichés;
red herrings;
strawman arguments;
whataboutisms; and
none.

10. The system of claim 9, further comprising, in response to receiving a veracity selection from a user to ignore the veracity of information included in the sentence when identifying the propagandizing tactic demonstrated in each sentence of the plurality of sentences:
categorizing false statements identically to true statements when selecting the propagandizing tactic from the list.

11. The system of claim 8, wherein the dimensional features include:
a relative position of a given sentence in the article relative to other sentences;
a semantic stance of the given sentence relative to a title of the article;
a sentiment of the given sentence; and
an article-level prediction of the article as a whole being propaganda.

12. The system of claim 11, wherein the semantic stance is selected from a group including:
- related agreeing;
- related disagreeing;
- related discussing; and
- unrelated.

13. The system of claim 11, wherein the sentiment is selected from a group including:
- positive;
- negative;
- neutral; and
- compound.

14. A memory apparatus that includes instructions that when executed by a processor perform operations, comprising:
- parsing each sentence of a plurality of sentences in an article for structural details, wherein the plurality of sentences represent a threshold number of sentences selected from a beginning of the article;
- identifying, via a machine learning model, dimensional features across the plurality of sentences based on the structural details;
- identifying, via the machine learning model, a propagandizing tactic demonstrated in each sentence of the plurality of sentences based on a covariance score to the propagandizing tactic and the dimensional features identified for a given sentence; and
- displaying, in a user interface that includes the article, propaganda labels corresponding to the propagandizing tactic identified for each sentence of the plurality of sentences.

15. The memory apparatus of claim 14, wherein the propagandizing tactic is selected by the machine learning model from a list comprising:
- name calling;
- repetition;
- slogans;
- appeal to fear;
- doubt;
- exaggeration;
- flag-waving;
- loaded language;
- association with an out-group;
- bandwagon;
- casual oversimplification;
- obfuscation;
- appeal to authority;
- binary fallacy;
- thought-terminating clichés;
- red herrings;
- strawman arguments;
- whataboutisms; and
- none.

16. The memory apparatus of claim 15, the operations further comprising, in response to receiving a veracity selection from a user to ignore the veracity of information included in the sentence when identifying the propagandizing tactic demonstrated in each sentence of the plurality of sentences:
- categorizing false statements identically to true statements when selecting the propagandizing tactic from the list.

17. The memory apparatus of claim 14, wherein the dimensional features include:
- a relative position of a given sentence in the article relative to other sentences;
- a semantic stance of the given sentence relative to a title of the article;
- a sentiment of the given sentence; and
- an article-level prediction of the article as a whole being propaganda.

18. The memory apparatus of claim 17, wherein the semantic stance is selected from a group including:
- related agreeing;
- related disagreeing;
- related discussing; and
- unrelated.

19. The memory apparatus of claim 17, wherein the sentiment is selected from a group including:
- positive;
- negative;
- neutral; and
- compound.

* * * * *